(No Model.) 4 Sheets—Sheet 1.

G. H. ELLIS.
KNOT TYING DEVICE FOR AUTOMATIC GRAIN BINDERS.

No. 567,737. Patented Sept. 15, 1896.

Witnesses.
Arthur Johnson

Inventor.
George H Ellis (No Model.) 4 Sheets—Sheet 2.

G. H. ELLIS.
KNOT TYING DEVICE FOR AUTOMATIC GRAIN BINDERS.

No. 567,737. Patented Sept. 15, 1896.

Witnesses.
Arthur Johnson

Inventor
George H. Ellis (No Model.) 4 Sheets—Sheet 3.
G. H. ELLIS.
KNOT TYING DEVICE FOR AUTOMATIC GRAIN BINDERS.
No. 567,737. Patented Sept. 15, 1896.
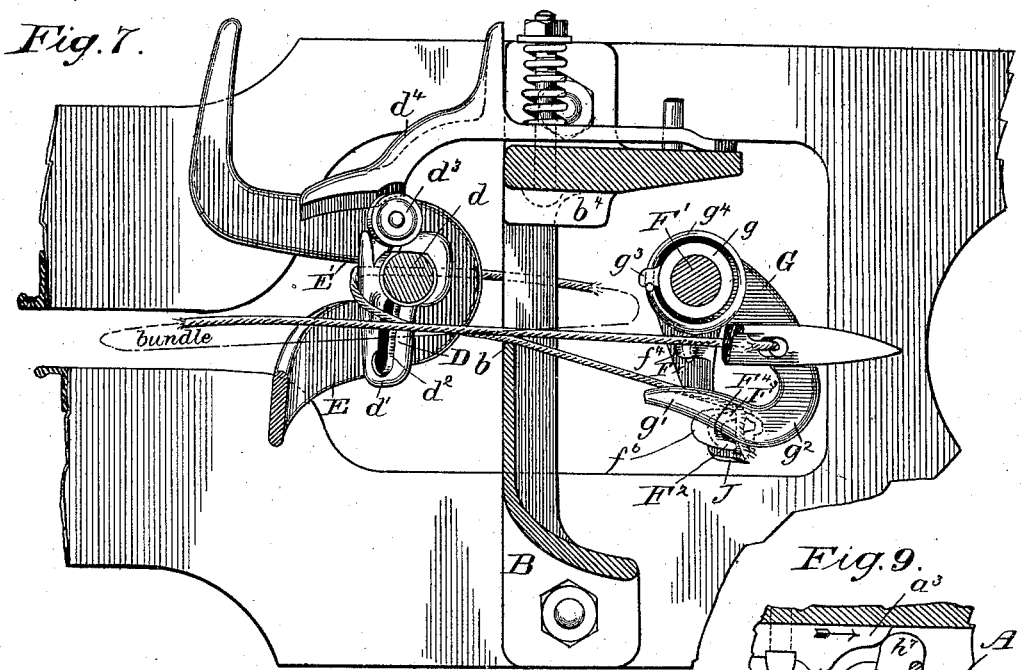
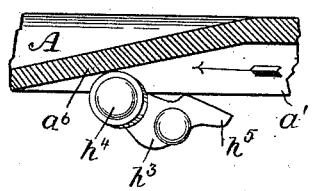
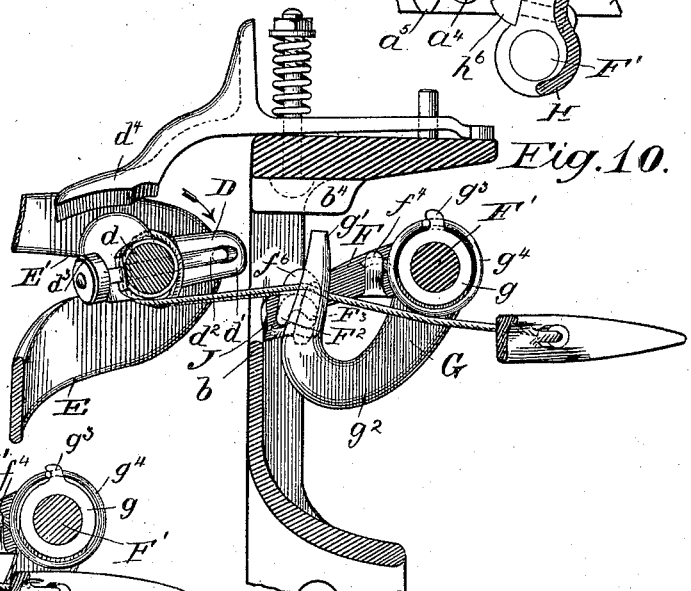
Witnesses
Arthur Johnson.
G. N. Smith
Inventor.
George H Ellis

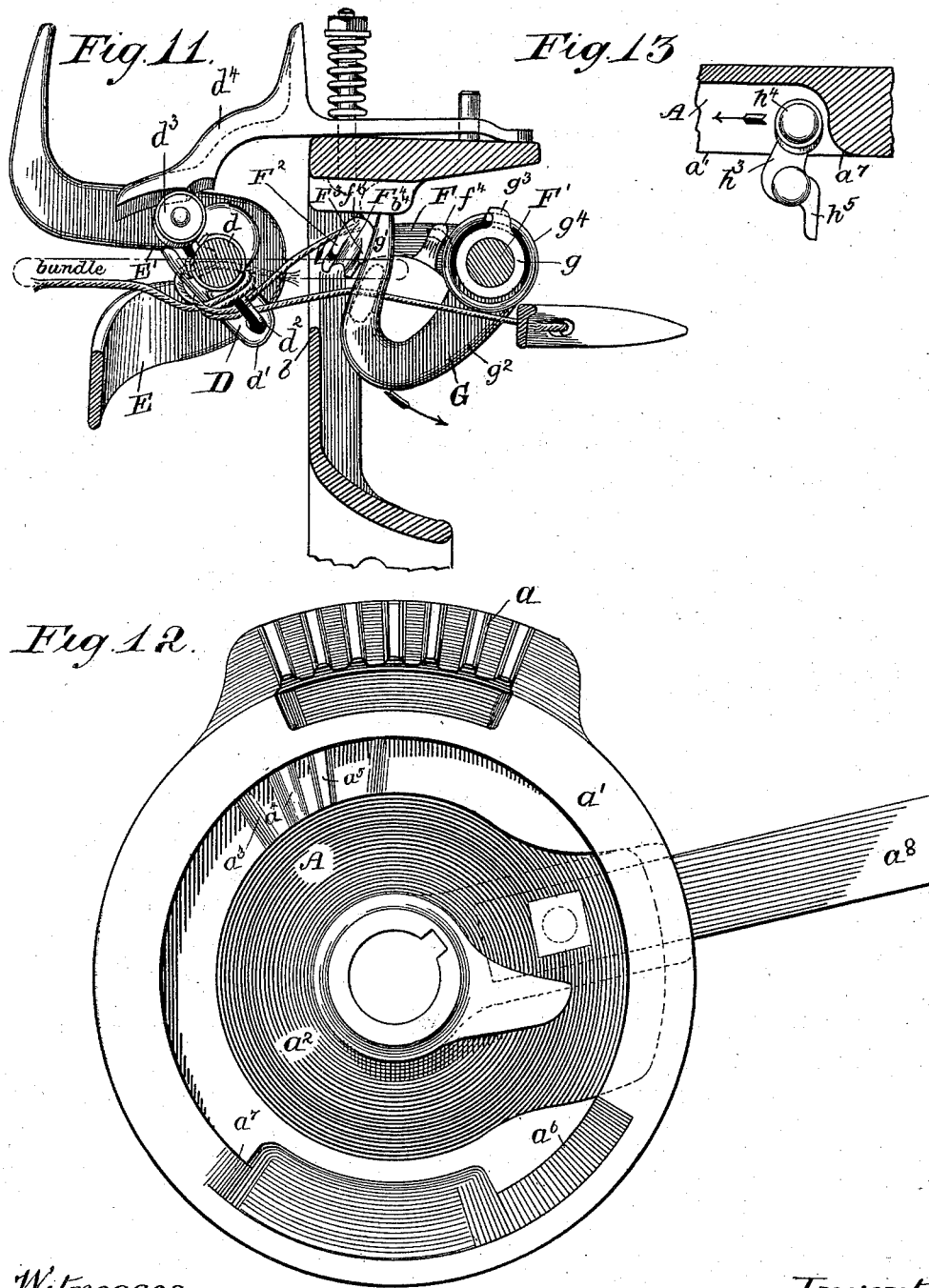

UNITED STATES PATENT OFFICE.

GEORGE H. ELLIS, OF CHICAGO, ILLINOIS.

KNOT-TYING DEVICE FOR AUTOMATIC GRAIN-BINDERS.

SPECIFICATION forming part of Letters Patent No. 567,737, dated September 15, 1896.

Application filed January 29, 1894. Serial No. 498,357. (No model.)

*To all whom it may concern:*

Be it known that I, GEORGE H. ELLIS, of the city of Chicago, county of Cook and State of Illinois, have invented certain new and useful Improvements in Knot-Tying Devices for Automatic Grain-Binders, of which the following is a full description, reference being had to the accompanying drawings, in which—

Figure 1:
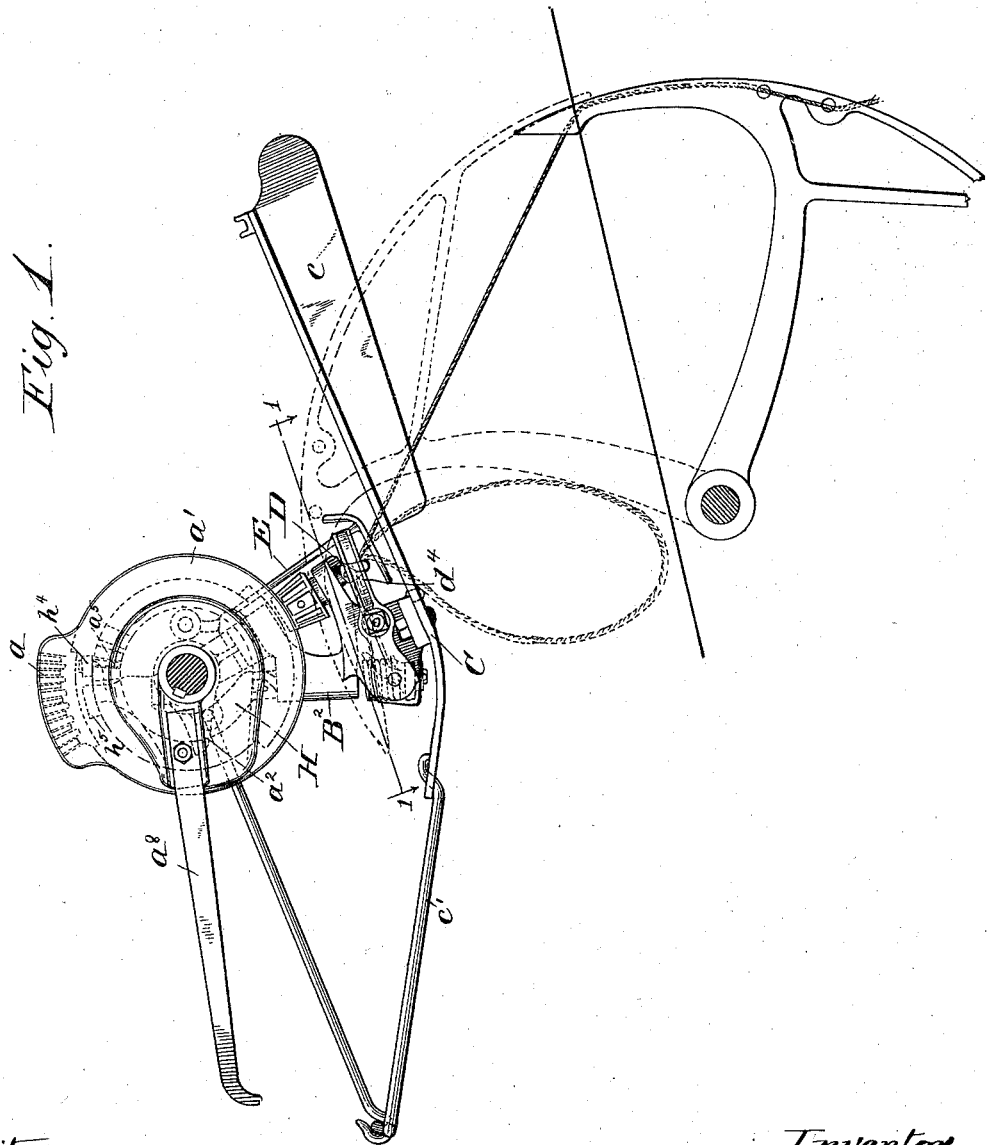
Figure 2:
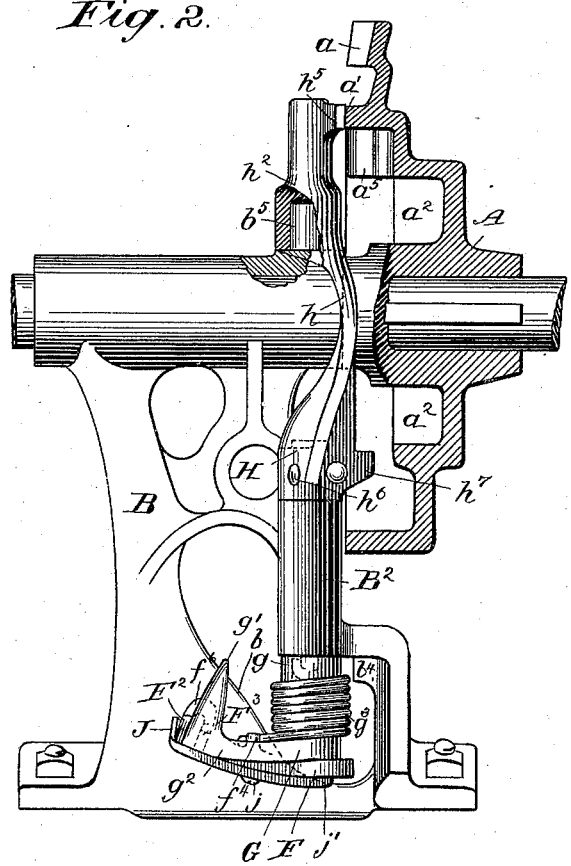
Figure 3:
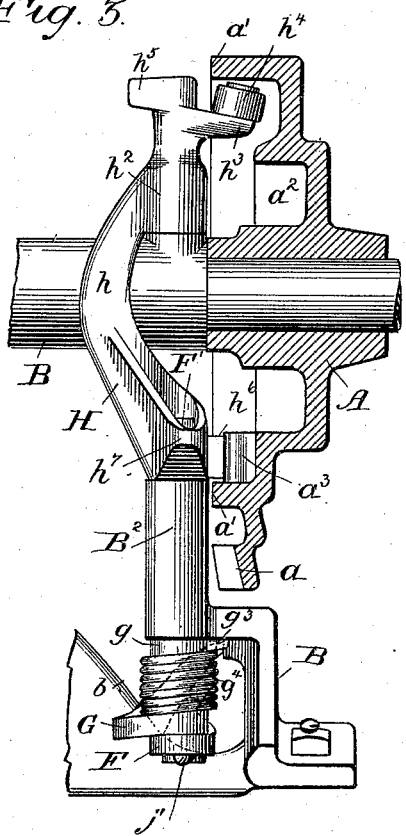
Figure 4:
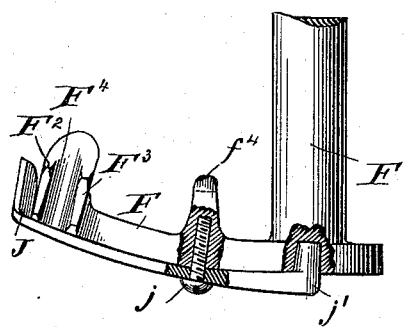
Figure 5:
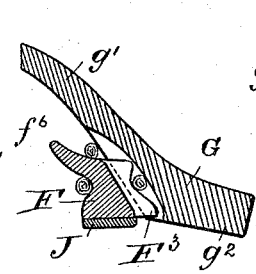
Figure 6:
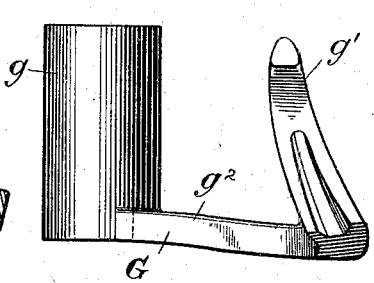

Figure 1 is a rear end sectional view of the knotting devices, needle, and binding-table. Figs. 2 and 3 are views of the holding devices as seen from beneath. Figs. 4, 5, and 6 are details of the holding device. Fig. 7 is a sectional view of the knotter, stripping, and holding devices as if cut on the line 1 1 of Fig. 1. Fig. 8 shows that portion of the main driving-wheel that serves as a cam to permit the holding device to yield, under the stress of the held twine, toward the knotter. Fig. 9 is a sectional view showing that portion of the main driving-wheel which serves as a mutilated gear to rock the cord-holding devices (when not drawn upward by the stress of the twine, as in turning the machine with the needle unthreaded) and for giving the final positive movement to the rock-shaft of the holding devices, which movement forces the holding-jaws to separate. Fig. 10 shows the knotting and cord-holding devices as if cut on the line 1 1 of Fig. 1, but with the knotting-hook in the position it occupies when about to seize the held ends of the twine after the knot is laid, and the holding devices when near the position they occupy when forced to open and release the held end. Fig. 11 is a similar view, but one that shows the knotter as having grasped the held ends and the holder as having set free its held end and in position to take the part of the twine to be newly held. Fig. 12 is a side view of the main driving cam-wheel A. Fig. 13 represents that portion of the main driving-wheel that actuates the cutting device and causes the holding devices to return to their position of rest. Fig. 14 illustrates the position that the twine to be cut occupies at the time that the act of cutting takes place.

The invention forming the subject-matter of this application relates to the cord-holding and twine-cutting devices and the parts immediately associated therewith, as well as means for operating them. In the present application I shall only claim such means, in combination with other elements of the invention, broadly, but in an application to be filed simultaneously herewith by John F. Steward and myself, Serial No. 498,368, we claim the specific means for carrying out the results that I obtain by my new holding device. Other means for operating the cord-holder may be used, such as, for instance, that shown in the patent to Burson, No. 273,811. I have tested several means for giving the holding devices their movement, but prefer that shown and described.

In the drawings, A is the main driving cam-wheel for the knotting, holding, and cutting devices, having the segment $a$ and delay-rim $a'$. These engage the pinion of the knotter-shaft $d$ and alternately give it a single rotation and hold it in a position of rest in the usual manner.

$a^2$ is a cam that gives movement to the knotter stripper-arm, also in the usual manner.

$a^3$, $a^4$, and $a^5$ constitute that portion of the wheel that rocks the cord-holder toward the knotter, and $a^6$ that portion which permits the cord-holding jaws to yield gradually toward the knotter as the latter requires twine to surround it.

$a^7$ is that portion of the cam that serves to move the holding devices to their position of rest, at the same time to cause the cutting of the twine.

B is the knotter and holder-frame.

C is the breastplate, a shield lying between the bundle receptacle and the knotting and holding devices, slotted to permit the passage of the point of the needle in laying the twine around the gavel, and having the cheek-piece $c$.

To the breastplate, which when generally considered is of the usual form, are secured the strippers $c'$, that serve to force the bundle away from the ejecting-arms $a^8$.

The knotter D is of the usual form and will be readily understood by reference to Figs. 7 and 10. In detail it consists of a shaft $d$, having a laterally-projecting point $d'$ and jaw $d^2$, pivoted within a slot therein, said jaw at one end adapted to coöperate with the permanent jaw $d'$ and at the other end having the antifriction-roller $d^3$. This roller by the rotation of the knotter is forced over a cam and the jaw thus opened in the usual manner with knotters of the present kind, and when in position of rest the roller is forced beneath the free end of a spring-held lever $d^4$.

E is the knotter discharging-arm, which is of the common kind, except that I prefer to remove the cord-cutter from it. No description is necessary other than to say that the cord-retaining notch E' is formed at the end adjacent to the knotter. It is pivoted to the frame at a point intermediate its ends, and at the end opposing the retaining-notch an antifriction-roller is provided that lies within a groove in the main driving-wheel, the tortuous walls of which serve as a cam to give it movement.

At $b$ of the knotter-frame is formed a cord-rest, (best understood by reference to Fig. 7.) Aside from this portion, against which the cord at times rests, and the part $b^4$ the frame may be considered as of any kind sufficient to support the various parts forming the subject-matter of this invention.

The holding device consists of jaws F and G, that are spring-held in contact during the greater portion of the time. I will denominate one of these elements, F, as the relatively-fixed jaw, and the one, G, as the relatively-movable jaw, and in speaking of their movements as one treat them as the rocking cord-holder.

F' is the holder-shaft, extending through the bearing $B^2$ of the main frame and connected to suitable means for giving it its rocking movements.

As far as the present application is concerned the irregularly-bent shaft H, suitably controlled by the main driving-wheel, may be considered as the specific means for giving the holders and cutter their movement, but in this application I shall treat the same as any competent means. I prefer these means, the joint invention of John F. Steward and myself, in preference to forms I have myself provided for the same purpose, they being simpler and, it is believed, on the whole more practical. Specifically considered, this means consists of an irregularly-crooked rock-shaft pinned or otherwise secured to the holder-shaft F', and to escape the main frame given the bend $h$. Upon the main frame is the stud $b^5$.

The portion $h^2$ of the curved rock-shaft F' is socketed and placed upon the stud $b^5$. The axis of this stud is, of course, coincident with the axis of the rocking cord-holder shaft.

Formed upon the rear end of the crooked rock-shaft $h$ is an arm $h^3$, having an antifriction-roller $h^4$. Upon the same end of the arm is also the delay-shoe $h^5$. While the antifriction-roller is adapted to ride upon the incline $a^6$ of the main driving-wheel, the delay-shoe, while the holder is at rest, rides upon the delay-rim $a'$ of the wheel.

Two gear-teeth are formed, $h^6$ and $h^7$, that are engaged and operated by the breasts of the irregular undulations $a^3$ and $a^4$ and the tooth $a^5$. As much labor is required of the tooth $a^5$ at an interval of forcing the holding-jaws to open, in order to prevent wear I make it of steel and suitably insert it in its supports. The details of construction of the holding devices will be best understood by reference to Figs. 4, 5, and 6, where the outer extremity of the relatively-fixed jaw is provided with the ridges $F^2$ and $F^3$, and the recess $F^4$ therebetween.

The hub $g$ of the relatively-movable jaw of the holder is bored to fit the shaft F' and rock thereon, its axis of movement thus being coincident with that of the shaft F'; but I do not wish to limit myself to this precise construction, for it is plain that the relatively-movable jaw may have its axis eccentric to that of the shaft F'. As far as this invention is concerned, when broadly considered, the movable jaw may be supposed to be pivoted not far at least eccentric to the axis of the shaft F, but in some manner pivoted in proper position to the relatively-fixed jaw. Extending in a general direction away from the breast-plate is the arm or extension $g'$, formed upon the radial arm $g^2$. This extension $g'$ reaches to such a distance from the breastplate as, when the holder is rocked, to pass very close beneath the needle and take the twine that is drawn over the knotter thereto when the holder is first rocked, and finally deflect said cord into the holding-jaw.

The preferable manner of jointing the two jaws of the holder can be best studied in Fig. 10, where the hub of the relatively-movable holder is shown to surround the shaft of the relatively-fixed holder-jaw. Projecting from said hub is a lug $g^3$, and projecting from the arm of the relatively-fixed holder-jaw is the lug $f^4$. Surrounding the hub of the relatively-movable jaw is the coiled spring $g^4$, one end hooking against the lug $g^3$ and the other against the lug $f^4$. The stress and direction of tension of this spring are such as to keep the jaws closed when the latter are not forced open. Upon the main frame is an abutment $b^4$ in such position that it shall be struck by the end of the arm $g'$ at such times as the holder as a whole is rocked to its greatest extreme of movement in the direction of paying the twine to the knotter.

The operation of opening the holder against the stress of the spring will be understood by reference to the same figure, when it is considered that the relatively-moveable jaw is elastically carried with the relatively-fixed jaw, and if the latter be moved by its positively-actuated device far enough the end of the arm $g'$ will be brought against the abutment $b^4$ and prevented from further movement, in which event the relatively-fixed jaw will be carried so far as to move it away from its mate, and the positions of the parts will be as shown in Fig. 11. I draw the held end of twine from the jaws by the same movement that opens them, and accomplish the result in a manner that will be understood from the description of the operation of the holder as a whole. With the parts in the position shown in Fig. 7 the held end of the twine is seen in dotted lines, and upon the relatively-fixed jaw of the holder is the slight flange $f^6$. As the holder is moved to the position shown in Fig. 10 the held end of the twine passes behind the ledge and is then made to somewhat nearly encircle the jaw; but when the jaw is moved so far that the end of the arm $g'$ strikes the abutment of the frame the element F of the holding-jaws not only moves away from its mate, but continues its movement so far as to cause the previously-held end of the twine to render around it, and thus compel the withdrawal referred to.

The cord-cutter J is secured to the relatively-fixed jaw of the holder by means of the screw $j$ and by permitting a boss $j'$ at one end to enter a slot in the arm F. This knife, however, may be secured in any convenient manner. To understand the operation of the cutting device, it is but necessary to turn to Figs. 10 and 14. In the former figure the twine is shown as passing beneath the flange $f^6$, and in Fig. 14 it is shown beneath said flange and between the flange and cutting-knife. It is plain, by further reference to Fig. 11, that when the holding-jaws are moved in the direction of the arrow the edge of the knife will be forced against the twine and thus sever it.

What I claim as my invention, and desire to secure by Letters Patent, is—

1. In a cord-holding device for grain binders, a positively-moved holding-jaw, a coöperating jaw connected thereto and elastically held thereagainst, in combination with means for giving movement to the said positively-moved jaw and coöperating jaw connected therewith, and with an abutment that the elastically-held jaw may strike to stop its movement, while the positively-moved jaw is moved to the end of its course, whereby the said jaws are thus adapted to be opened and closed, substantially as described.

2. In a cord-holding device for grain-binders, a positively-moved holding-jaw, a coöperating jaw pivotally connected thereto and elastically held thereagainst, in combination with means for giving movement to the said positively-moved jaw and coöperating jaw connected therewith, and with an abutment that the elastically-held jaw may strike to stop its movement, while the positively-moved jaw is moved to the end of its course, whereby the said jaws are thus adapted to be opened and closed, substantially as described.

3. In combination with the form of knotter that in its rotation wraps the twine around itself and thus requires the latter to be supplied to it, a cord-holder adapted to hold the twine at such a distance from the said knotter that when passed through sufficient movement will supply such length of twine, said holder having a positively-moved jaw, with a spring-held jaw connected thereto, said positively-moved jaw adapted to gradually move in the proper direction to yield the held twine toward the knotter, and a stop adapted to arrest the movement of the spring-held jaw so that the continued movement of the positively-moved jaw forces the said jaws to open, all arranged substantially as described.

4. In combination with the form of knotter that in its rotation wraps the twine around itself and thus requires the latter to be supplied to it, a cord-holder adapted to hold the twine at such a distance from the said knotter that when passed through sufficient movement will supply such length of twine, said holder having a positively-moved jaw, with a spring-held jaw pivoted thereto, said positively-moved jaw adapted to gradually move in the proper direction to yield the held twine toward the knotter, and a stop adapted to arrest the movement of the spring-held jaw so that the continued movement of the positively-moved jaw forces the said jaws to open, all arranged substantially as described.

5. In combination with the cord-tying device, a positively-moved holding-jaw and means for moving it, an elastically-held opposing jaw connected thereto, the said holding-jaw outwardly depending from its shaft and shaped substantially as described so as to be adapted to wind the held end of the twine around itself during such movement, an abutment against which said opposing jaw may strike and thus be caused to open away therefrom by the further movement of said positively-moved holding-jaw and thus separate the coöperating elements of the holding device and at the same time force the end of the twine set free to render around the said holder-jaw and thus be drawn from the coöperating jaws, substantially as described.

6. In combination with the cord-tying device, a positively-moved holding-jaw and means for moving it, an elastically-held opposing jaw pivotally connected thereto, the said holding-jaw outwardly depending from its shaft and shaped substantially as described so as to be adapted to wind the held end of the twine around itself during such movement, an abutment against which said opposing jaw may strike and thus be caused to open away therefrom by the further movement of said positively-moved holding-jaw and thus separate the coöperating elements of the holding device and at the same time force the end of the twine set free to render around the said holder-jaw and thus be drawn from the coöperating jaws, substantially as described.

7. A cord-holding device consisting of the positively-moved holding-jaw, and elastically-held yielding-jaw suitably connected thereto and coöperating therewith, said elastically-yielding jaw provided with the tucking-arm $g'$ adapted to take the twine from the needle and so deflect it as to cause it to enter the holding-jaws when opened, said tucking extension also adapted to engage a stop and thus permit the continued movement of the positively-moved jaw to open the latter to receive the twine engaged and deflected by the said arm $g'$, all combined substantially as described.

8. In a cord-holding and cord-cutting device and in combination, a positively-moved holding-jaw, a coöperating jaw pivotally connected thereto and elastically held thereagainst, an abutment against which said coöperating jaw strikes, a cutting-blade as one part with said positively-moved jaw and means for giving an oscillating movement to the said jaws, the said cutting-blade having its edge in the direction of discharge whereby the newly-engaged twine is severed during the retrograde movement of the holding-jaws, substantially as described.

9. In a cord-holding and cord-cutting device, and in combination, a positively-moved holding-jaw, a coöperating jaw pivotally connected thereto and elastically held thereagainst, an abutment against which said coöperating jaw strikes, a cutting-blade as one part with said positively-moved jaw, means for giving an oscillating movement to the said jaws, the said cutting-blade having its edge in the direction of discharge whereby the newly-engaged twine is severed during the retrograde movement of the holding-jaws, and the stop $b$ on the side of the twine to be cut, opposite to the knife, to adapt it to act as a resistant to the cutting stress of said knife-blade, substantially as described.

GEORGE H. ELLIS.

Witnesses:
ARTHUR JOHNSON,
M. E. HOLTON.